(12) United States Patent
Chen et al.

(10) Patent No.: US 10,824,470 B2
(45) Date of Patent: Nov. 3, 2020

(54) METHOD FOR RESOURCE ALLOCATION AND TERMINAL DEVICE

(71) Applicant: Guangdong Oppo Mobile Telecommunications Corp., Ltd., Guangdong (CN)

(72) Inventors: Yan Chen, Guangdong (CN); Jie Cheng, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 9 days.

(21) Appl. No.: 16/164,059

(22) Filed: Oct. 18, 2018

(65) Prior Publication Data

US 2019/0129753 A1    May 2, 2019

(30) Foreign Application Priority Data

Oct. 31, 2017 (CN) .......................... 2017 1 1047929

(51) Int. Cl.
*G06F 9/46* (2006.01)
*G06F 9/50* (2006.01)
(Continued)

(52) U.S. Cl.
CPC ............ *G06F 9/5005* (2013.01); *G06F 1/329* (2013.01); *G06F 9/5011* (2013.01);
(Continued)

(58) Field of Classification Search
CPC ...... G06F 9/5005; G06F 1/329; G06F 9/5011; G06F 9/5061; G06F 9/5027;
(Continued)

(56) References Cited

U.S. PATENT DOCUMENTS 9,240,945 B2 * 1/2016 Kumar .................... H04L 47/10
9,558,004 B1 * 1/2017 Alonzo ................. G06F 9/3891
(Continued)

FOREIGN PATENT DOCUMENTS

CN      102073504 A     5/2011
CN      104731304 A     6/2015
(Continued)

OTHER PUBLICATIONS

International search report issued in corresponding international application No. PCT/CN2018109870 dated Jan. 4, 2019.
(Continued)

*Primary Examiner* — Diem K Cao (57) ABSTRACT

A method for resource allocation and a terminal device are provided. The method includes the following. An operating system first identifies an internal running scenario of a target application running in a foreground of a terminal device. The operating system then acquires a plurality of resource adjustment strategies associated with preset system resources to-be-adjusted in the internal running scenario. The operating system acquires status information of the internal running scenario. Thereafter, the operating system adjusts usage priorities of the plurality of resource adjustment strategies according to the status information. The operating system adjusts the preset system resources to-be-adjusted by selecting a resource adjustment strategy with the highest priority.

8 Claims, 6 Drawing Sheets

(51) Int. Cl.
*G06F 1/329* (2019.01)
*H04M 1/725* (2006.01)
(52) U.S. Cl.
CPC ...... *G06F 9/5061* (2013.01); *H04M 1/72544* (2013.01); *H04M 1/72569* (2013.01); *G06F 9/5027* (2013.01); *G06F 2209/508* (2013.01); *G06F 2209/5021* (2013.01); *Y02D 10/00* (2018.01)
(58) Field of Classification Search
CPC ...... G06F 2209/5021; G06F 2209/508; H04M 1/72544; H04M 1/72569; Y02D 10/36; Y02D 10/22
See application file for complete search history.

(56) References Cited

U.S. PATENT DOCUMENTS

| | | | |
|---|---|---|---|
| 9,564,866 B2 * | 2/2017 | Zhang | ...................... H03G 3/20 |
| 2005/0149940 A1 * | 7/2005 | Calinescu | ............. G06F 9/5061 |
| | | | 718/104 |
| 2012/0159090 A1 | 6/2012 | Jeffrey et al. | |
| 2016/0378081 A1 * | 12/2016 | Della Corte | ........... G07C 13/00 |
| | | | 700/275 |
| 2017/0192819 A1 * | 7/2017 | Xie | ....................... G06F 9/5011 |

FOREIGN PATENT DOCUMENTS

| | | |
|---|---|---|
| CN | 104991775 A | 10/2015 |
| CN | 105677477 A | 6/2016 |
| CN | 106020973 A | 10/2016 |
| CN | 106095592 A | 11/2016 |
| CN | 106528290 A | 3/2017 |
| CN | 106657578 A | 5/2017 |
| CN | 107122201 A | 9/2017 |
| EP | 2874063 A2 | 5/2015 |

OTHER PUBLICATIONS

Extended European search report issued in corresponding European application No. 18200361.6 dated Mar. 18, 2019.
English translation of Decision of Rejection issued in corresponding CN application No. 201711047929.X dated Mar. 27, 2020.

* cited by examiner

FIG. 1A

Android system

FIG. 7

METHOD FOR RESOURCE ALLOCATION AND TERMINAL DEVICE

CROSS-REFERENCE TO RELATED APPLICATION(S)

This application claims priority to Chinese Patent Application No. 201711047929.X, filed on Oct. 31, 2017, the content of which is hereby incorporated by reference in its entirety.

TECHNICAL FIELD

This disclosure relates to the technical field of terminal devices, and particularly to a method for resource allocation and a terminal device.

BACKGROUND

With the rapid development of technologies relating to terminal devices, an increasing number of applications are installed in mobile phones of users, such as reading applications, payment applications, game applications, music applications, and the like. People's daily life is closely linked with the mobile phones.

SUMMARY

Implementations of the present disclosure provide a method for resource allocation and a terminal device.

According to a first aspect of the implementations of the disclosure, a method for resource allocation is provided. The method is applicable to a terminal device with an operating system and at least one application running in the terminal device. The method includes the following.

The operating system identifies an internal running scenario of a target application running in a foreground of the terminal device. The operating system acquires a plurality of resource adjustment strategies associated with preset system resources to-be-adjusted in the internal running scenario. The operating system acquires status information of the internal running scenario. The operating system adjusts usage priorities of the plurality of resource adjustment strategies according to the status information. The operating system adjusts the preset system resources to-be-adjusted by selecting a resource adjustment strategy with the highest priority.

According to a second aspect of the implementations of the disclosure, a terminal device is provided. The terminal device includes a processor and a memory configured to store executable program codes, which, when executed, cause the processor to: identify an internal running scenario of a target application running in a foreground of the terminal device, acquire a plurality of resource adjustment strategies associated with preset system resources to-be-adjusted in the internal running scenario, acquire status information of the internal running scenario, adjust usage priorities of the plurality of resource adjustment strategies according to the status information, and adjust the preset system resources to-be-adjusted by selecting a resource adjustment strategy with the highest priority.

According to a third aspect of the disclosure, there is provided a non-transitory computer-readable storage medium storing a computer program which, when executed by a processor, cause the processor to carry out following actions.

An internal running scenario of a target application running in a foreground of the terminal device is identified. A plurality of resource adjustment strategies associated with preset system resources to-be-adjusted in the internal running scenario is acquired. Status information of the internal running scenario is acquired. Usage priorities of the plurality of resource adjustment strategies are adjusted according to the status information. The preset system resources to-be-adjusted is adjusted by selecting a resource adjustment strategy with the highest priority.

BRIEF DESCRIPTION OF THE DRAWINGS

The following briefly introduces the accompanying drawings required for describing the implementations.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The terminal device involved in the implementations of the present disclosure may include various handheld devices, in-vehicle devices, wearable devices, computing devices that have wireless communication functions or other processing devices connected to the wireless scenario, as well as various forms of user equipments (UE), mobile stations (MS), terminal devices, and the like. For the convenience of description, the above-mentioned devices are collectively referred to as a terminal device. An operating system related to the implementations of the disclosure is a software system that manages hardware resources uniformly and provides a user with a service interface.

Figure 1A:
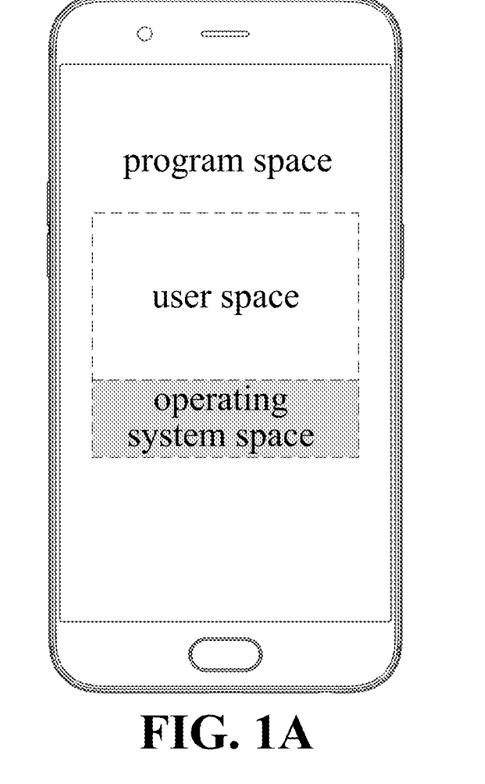
FIG. 1A is a schematic structural diagram illustrating a smart phone.
Figure 1B:
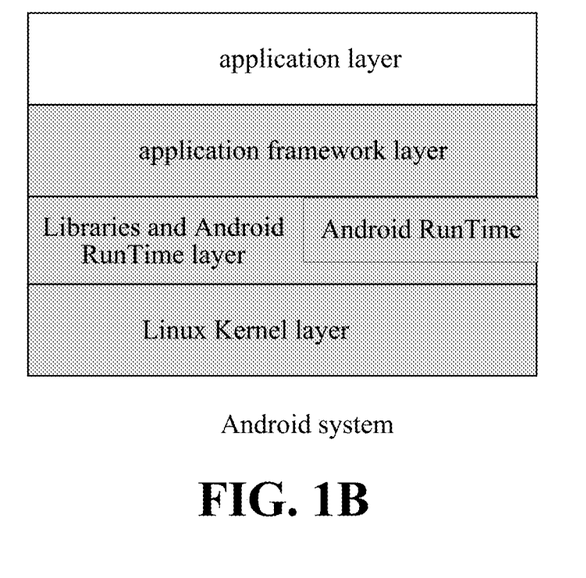
FIG. 1B is a schematic diagram illustrating a system architecture of an Android® system.

As illustrated in FIG. 1A, a terminal device such as a smart phone generally has a program space for running programs. The program space includes a user space and an operating system space (that is, a place to install the operating system). One or more applications, which are third-party applications installed on the terminal device, can run in the user space. An operating system of the terminal device runs in the operating system space. Examples of the operating system include but are not limited to an Android® system, a mobile operating system iOS® developed by Apple®, etc. As illustrated in FIG. 1B, the following describes the Android system runs on the terminal device as an example. In the case of Android system, the user space includes an application layer of the Android system and the operating system space includes an application framework layer, Libraries and Android RunTime layer, and Linux Kernel layer of the Android system. The application layer includes various applications directly interacting with a user, or service programs written in the Java language and running in the background, for example, programs for implementing common basic functions on smart phones, such as short messaging service (SMS), telephone dialing, picture viewers, calendars, games, maps, world wide web (Web) browsers, etc., as well as other applications developed by developers. The application framework layer provides a series of libraries required in developing Android applications, which can be used to reuse components as well as personalize extensions through inheritance. The Libraries and Android RunTime layer can support the application framework and provide services for various components in the Android system. The Libraries and Android RunTime layer include Libraries and Android RunTime. The Android RunTime includes a core library and a Dalvik virtual machine. The Linux kernel layer is configured to implement core functions such as hardware device driving, process and memory management, network protocol stacks, power management, wireless communication, and the like.

In general design, a target application runs in the user space. When the target application needs to perform operations such as sending data, reading disk data, and the like, standard interface functions provided by the operating system such as "write" and "send" should be invoked. That is, a central processing unit (CPU) invokes codes of the operating system space to achieve request operations of the user. The operating system of the terminal device generally improves allocation of system resources (such as increasing a clock rate of the CPU, etc.) as a whole to accelerate the target application.

In view of the above, implementations of the present disclosure provide a method for resource allocation of the target application of the terminal device. With regard to the method, the operating system of the terminal device first identifies an internal running scenario of the target application running in a foreground of the terminal device. The operating system then acquires a plurality of resource adjustment strategies associated with preset system resources to-be-adjusted in the internal running scenario. The operating system acquires status information of the internal running scenario. Thereafter, the operating system adjusts usage priorities of the plurality of resource adjustment strategies according to the status information. At last, the operating system adjusts the preset system resources to-be-adjusted by selecting a resource adjustment strategy with the highest priority. The operating system can adjust dynamically the usage priorities of the plurality of resource adjustment strategies according to the status information of the internal running scenario and adjust the preset system resources by using the resource adjustment strategy with the highest priority, which makes it possible to adjust resource allocation of the same internal running scenario differently and reduce power consumption of a running process of the target application.

The following describes the implementations of the disclosure in conjunction with the accompanying drawings.

Figure 2:
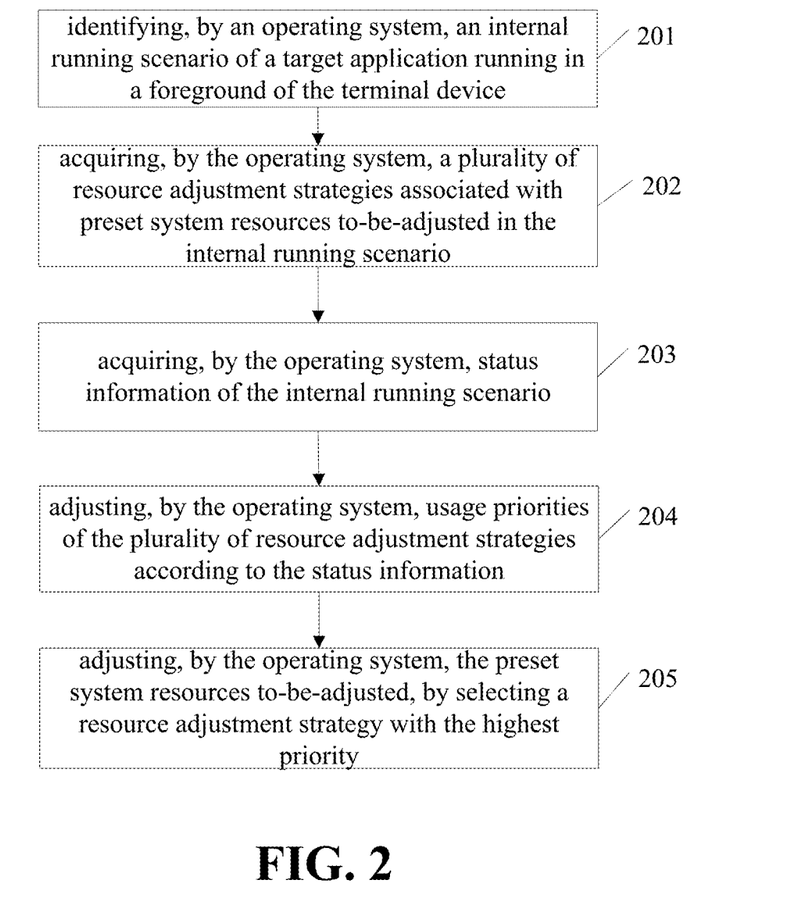
FIG. 2 is a schematic flow chart illustrating a method for resource allocation according to an implementation of the present disclosure.

FIG. 2 is a schematic flow chart illustrating a method for resource allocation according to an implementation of the present disclosure. The method is applicable to a terminal device with an operating system and at least one application running in the terminal device. As illustrated in FIG. 2, the method begins with operations at block 201.

At block 201, the operating system identifies an internal running scenario of a target application running in a foreground of the terminal device.

The target application includes but is not limited to a system application(s) and a third-party application(s) installed on the terminal device. Taking a game application as an example of the target application, the internal running scenario can include a team battle scenario, a mall scenario, and the like. Each internal running scenario can be subdivided into a plurality of sub-scenarios according to a running sequence or a status of a game character, such as a waiting-for-resurrection sub-scenario in the team battle scenario, a sub-scenario of a team battle screen waiting to be loaded, a sub-scenario of waiting to return to a city, and the like. Resource allocation strategies of these sub-scenarios can be adjusted differently according to actual needs of the user, so as to adjust system resources more accurately.

The team battle scenario in the game application can refer to a collective confrontation of several players in groups (such as in gangs, in teams, and the like).

The mall scenario in the game application can refer to a scenario where game characters can buy tools, skills, clothes, and the like.

At block 202, the operating system acquires a plurality of resource adjustment strategies associated with preset system resources to-be-adjusted in the internal running scenario.

Each kind of system resources corresponds to a plurality of resource adjustment strategies. For example, CPU resources can correspond to low-power-consumption adjustment strategy, a dynamic-frequency-hopping adjustment strategy, a high-performance adjustment strategy, and the like.

The resource adjustment strategies are configured to adjust the system resources. The system resources include at least one of the following: memory resources, CPU resources, graphic processing unit (GPU) resources, display resources, network resources, and disk read/write (input/output) resources.

At block 203, the operating system acquires status information of the internal running scenario.

The status information includes at least one of: an operation parameter(s) and a status of a game character.

The operation parameter can include but is not limited to frequency, length, or times of a touch operation. The present disclosure is not particularly limited.

The status of the game character can include but is not limited to resurrection, stillness, exercise, and the like. The present disclosure is not particularly limited.

At block 204, the operating system adjusts usage priorities of the plurality of resource adjustment strategies according to the status information.

At block 205, the operating system adjusts the preset system resources to-be-adjusted by selecting a resource adjustment strategy with the highest priority. According to the implementation of the disclosure, the operating system of the terminal device first identifies the internal running scenario of the target application running in the foreground of the terminal device. The operating system then acquires the plurality of resource adjustment strategies associated with the preset system resources to-be-adjusted in the internal running scenario. The operating system acquires the status information of the internal running scenario. Thereafter, the operating system adjusts the usage priorities of the plurality of resource adjustment strategies according to the status information. At last, the operating system adjusts the preset system resources to-be-adjusted by selecting the resource adjustment strategy with the highest priority. The operating system can adjust dynamically the usage priorities of the plurality of resource adjustment strategies according to the status information of the internal running scenario and adjust the preset system resources by using the resource adjustment strategy with the highest priority, which makes it possible to adjust resource allocation of the same internal running scenario differently and reduce power consumption of a running process of the target application.

As an implementation, the status information includes an operation parameter(s) of an operation interface of the internal running scenario. The operating system can adjust the usage priorities of the plurality of resource adjustment strategies according to the status information as follows. The operating system determines a parameter range to which the operation parameter belongs. The operating system determines reference usage priorities of the plurality of resource adjustment strategies corresponding to the parameter range to which the operation parameter belongs, according to a preset correspondence between preset parameter ranges and usage priorities of the plurality of resource adjustment strategies. The operating system adjusts the usage priorities of the plurality of resource adjustment strategies according to the determined reference usage priorities of the plurality of resource adjustment strategies.

The operation parameter includes at least one of: touch times, touch frequency, and touch duration. For example, the system resources include brightness of a display screen, and the resource adjustment strategies include a total of five adjustment strategies, such as adjusting according to an application request, adjusting according to user-setting information, adjusting according to the power of a mobile phone, adjusting according to the temperature of the mobile phone, and adjusting according to ambient light. For example, an initial order of priorities is: adjusting according to an application request> adjusting according to user-setting information> adjusting according to the power of the mobile phone> adjusting according to the temperature of the mobile phone> adjusting according to ambient light. The order of priorities of the resource adjustment strategies corresponding to a first parameter range ([5-20]) to which preset touch frequency belongs is: adjusting according to an application request> adjusting according to user-setting information> adjusting according to power of the mobile phone> adjusting according to temperature of the mobile phone> adjusting according to ambient light. The order of priorities of the resource adjustment strategies corresponding to a second parameter range ([0-4]) is: adjusting according to power of the mobile phone> adjusting according to an application request> adjusting according to user-setting information> adjusting according to temperature of the mobile phone> adjusting according to ambient light. If the operating system detects that the touch frequency in a first time period is 8 times/second, which corresponds to the first parameter range, the order of priorities will remain unchanged. Continue to use a strategy of adjusting according to an application request. If the operating system detects that the touch frequency in a second time period is 2 times/second, which corresponds to the second parameter range, the order of priorities will be adjusted to: adjusting according to power of the mobile phone> adjusting according to an application request> adjusting according to user-setting information> adjusting according to temperature of the mobile phone> adjusting according to ambient light. If the power is low at this time, the brightness of the display screen can be reduced, which makes it possible to reduce power consumption.

According to this implementation of the disclosure, the operating system can acquire the operation parameter of the operation interface of the internal running scenario of the target application, in order to adjust in time and correspondingly the preference usage priorities of the plurality of resource adjustment strategies according to the operation parameter and adjust the usage priorities of the plurality of resource adjustment strategies according to the preference usage priorities, so as to avoid high power consumption caused by adjustment operation by using a single strategy of a priority continuously. In this way, intelligence of resource adjustment in a running process of the target application can be improved, power consumption can be reduced, and power-consumption-optimization performance can be improved.

As an implementation, the status information is configured to indicate a status of a game character of a game account owner. The operating system can adjust the usage priorities of the plurality of resource adjustment strategies according to the status information as follows. The operating system determines a current status of the game character of the game account owner. Then the operating system determines reference usage priorities of the plurality of resource adjustment strategies corresponding to the current status of the game character of the owner game account, according to a preset correspondence between statuses of the game character and usage priorities of the plurality of resource adjustment strategies. The operating system adjusts the usage priorities of the plurality of resource adjustment strategies according to the determined reference usage priorities of the plurality of resource adjustment strategies.

The terminal device can store in advance the correspondence between preset statuses of the game character and usage priorities of the plurality of resource adjustment strategies. The correspondence is not limited herein, for example, it can be user-defined, set by a game developer in advance, or obtained by counting and analyzing historical usage data according to a preset machine learning algorithm by the operating system. As an implementation, the correspondence can include a corresponding relationship between a waiting-for-resurrection status and a first resource adjustment strategy, a corresponding relationship between a stillness status (e.g., the game character can be determined as at a stillness status when it stays at the same position for more than 5 seconds) and a second resource adjustment strategy, a corresponding relationship between a continuous-release-skill status and a third resource adjustment strategy, and the like.

According to this implementation of the disclosure, the operating system can acquire the status information of the game character of the game account owner of the internal running scenario of the target application, based on the status information acquired, it is possible to correspondingly adjust in time the preference usage priorities of the plurality of resource adjustment strategies, and conduct system resource adjustment with the resource adjustment strategy with the highest priority, so as to avoid high power consumption caused by continuously using a single resource adjustment strategy of a fixed priority. In this way, intelligence of resource adjustment in a running process of the target application can be improved, power consumption can be reduced, and power-consumption-optimization performance can be improved.

As an implementation, the plurality of resource adjustment strategies associated with the preset system resources to-be-adjusted includes an application level adjustment strategy.

The application level adjustment strategy includes a strategy for adjusting the preset system resources to-be-adjusted according to application status information of the application. The application status information includes the status information of the internal running scenario.

According to the implementation of the disclosure, generally, the application level adjustment strategy tends to focus on performance prioritization.

As an implementation, the preset system resources to-be-adjusted include at least one of: brightness of the display screen, computing resources (computing resources of CPU and GPU), memory resources, and network resources.

Figure 3:
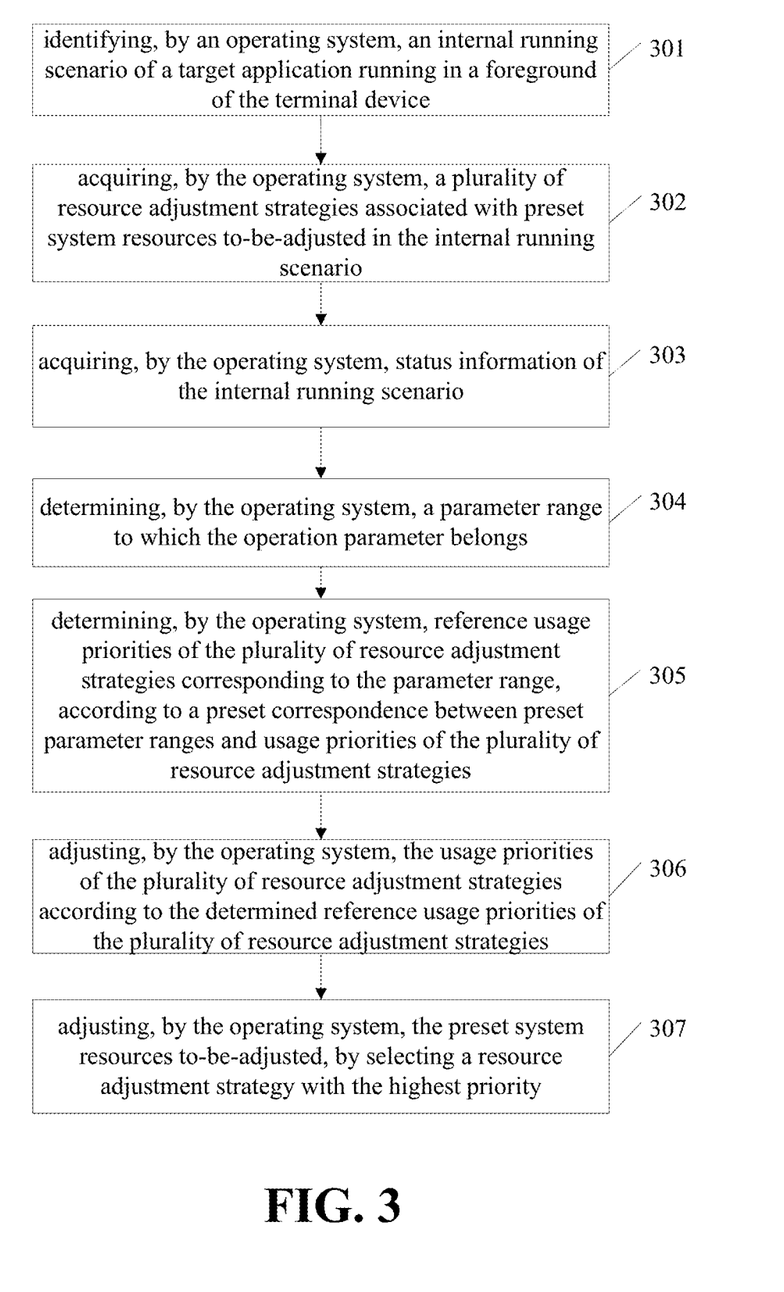
FIG. 3 is a schematic flow chart illustrating a method for resource allocation according to an implementation of the present disclosure.

Consistent with the implementations illustrated in FIG. 2, FIG. 3 is a schematic flow chart illustrating a method for resource allocation according to an implementation of the present disclosure. The method is applicable to a terminal device with an operating system and at least one application running in the terminal device. As illustrated in FIG. 3, the method begins with operations at block 301.

A block 301, the operating system identifies an internal running scenario of a target application running in a foreground of the terminal device.

A block 302, the operating system acquires a plurality of resource adjustment strategies associated with preset system resources to-be-adjusted in the internal running scenario.

A block 303, the operating system acquires status information of the internal running scenario, where the status information includes an operation parameter.

A block 304, the operating system determines a parameter range to which the operation parameter belongs.

A block 305, the operating system determines reference usage priorities of the plurality of resource adjustment strategies corresponding to the parameter range to which the operation parameter belongs, according to a preset correspondence between preset parameter ranges and usage priorities of the plurality of resource adjustment strategies.

A block 306, the operating system adjusts the usage priorities of the plurality of resource adjustment strategies according to the determined reference usage priorities of the plurality of resource adjustment strategies.

A block 307, the operating system adjusts the preset system resources to-be-adjusted by selecting a resource adjustment strategy with the highest priority.

According to the implementation of the disclosure, the operating system of the terminal device first identifies the internal running scenario of the target application running in the foreground of the terminal device. The operating system then acquires the plurality of resource adjustment strategies associated with the preset system resources to-be-adjusted in the internal running scenario. The operating system acquires the status information of the internal running scenario. Thereafter, the operating system adjusts the usage priorities of the plurality of resource adjustment strategies according to the status information. At last, the operating system adjusts the preset system resources to-be-adjusted by selecting the resource adjustment strategy with the highest priority. The operating system can adjust dynamically the usage priorities of the plurality of resource adjustment strategies according to the status information of the internal running scenario and adjust the preset system resources by using the resource adjustment strategy with the highest priority, which makes it possible to adjust resource allocation of the same internal running scenario differently and reduce power consumption of a running process of the target application.

In addition, the operating system can acquire the operation parameter of the operation interface of the internal running scenario of the target application, in order to adjust in time and correspondingly the preference usage priorities of the plurality of resource adjustment strategies according to the operation parameter and adjust the usage priorities of the plurality of resource adjustment strategies according to the preference usage priorities, so as to avoid high power consumption caused by adjustment operation by using a single strategy of a priority continuously. In this way, intelligence of resource adjustment in a running process of the target application can be improved, power consumption can be reduced, and power-consumption-optimization performance can be improved.

Figure 4:
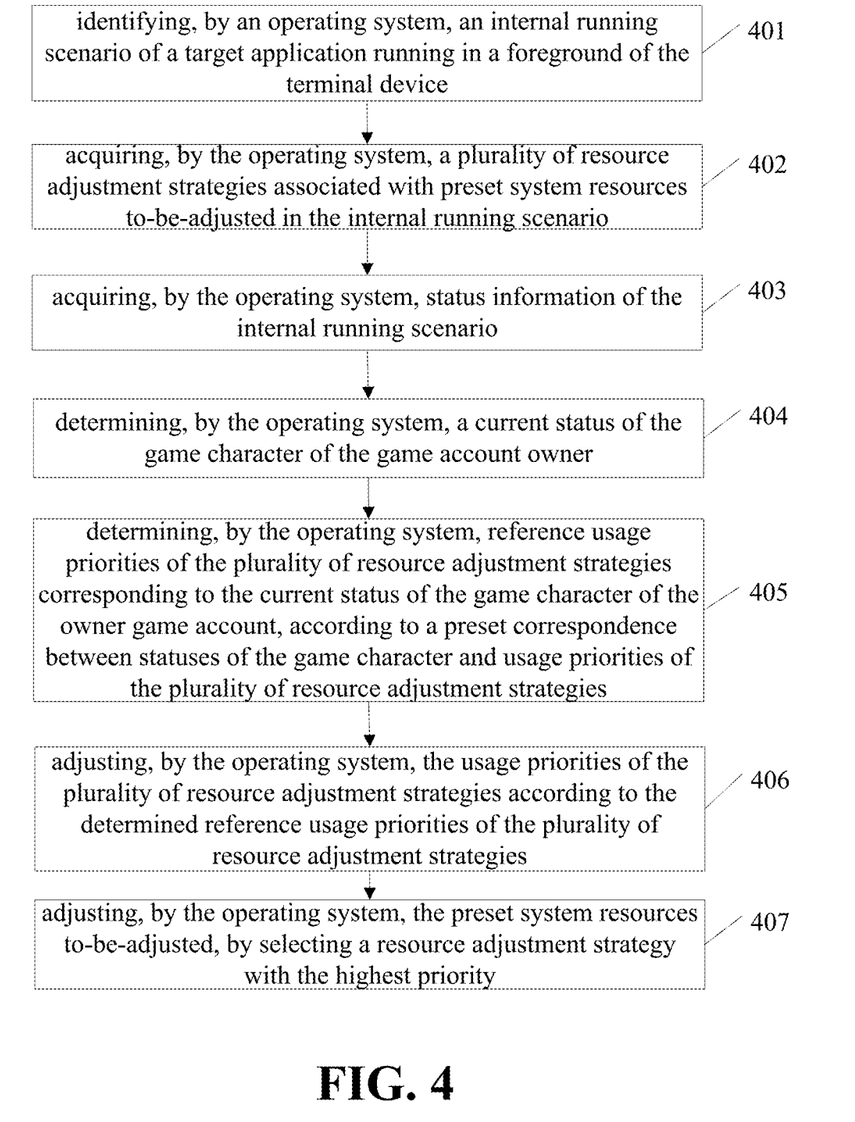
FIG. 4 is a schematic flow chart illustrating a method for resource allocation according to an implementation of the present disclosure.

Consistent with the implementations illustrated in FIG. 2, FIG. 4 is a schematic flow chart illustrating a method for resource allocation according to an implementation of the present disclosure. The method is applicable to a terminal device with an operating system and at least one application running in the terminal device. As illustrated in FIG. 4, the method begins with operations at block 401.

A block 401, the operating system identifies an internal running scenario of a target application running in a foreground of the terminal device.

A block 402, the operating system acquires an application level adjustment strategy in the internal running scenario, where the application level adjustment strategy includes a strategy for adjusting the preset system resources to-be-adjusted according to application status information of the application and the application status information includes the status information of the internal running scenario.

A block 403, the operating system acquires status information of the internal running scenario, where the status information is configured to indicate a status of a game character of a game account owner.

A block 404, the operating system determines a current status of the game character of the game account owner.

A block 405, the operating system determines reference usage priorities of the application level adjustment strategy corresponding to the current status of the game character of the owner game account according to a preset correspondence between statuses of the game character and usage priorities of the plurality of resource adjustment strategies.

A block 406, the operating system adjusts the usage priorities of the plurality of resource adjustment strategies according to the determined reference usage priorities of the plurality of resource adjustment strategies.

A block 407, the operating system adjusts the preset system resources to-be-adjusted by selecting a resource adjustment strategy with the highest priority.

According to the implementation of the disclosure, the operating system of the terminal device first identifies the internal running scenario of the target application running in the foreground of the terminal device. The operating system then acquires the plurality of resource adjustment strategies associated with the preset system resources to-be-adjusted in the internal running scenario. The operating system acquires the status information of the internal running scenario. Thereafter, the operating system adjusts the usage priorities of the plurality of resource adjustment strategies according to the status information. At last, the operating system adjusts the preset system resources to-be-adjusted by selecting the resource adjustment strategy with the highest priority. The operating system can adjust dynamically the usage priorities of the plurality of resource adjustment strategies according to the status information of the internal running scenario and adjust the preset system resources by using the resource adjustment strategy with the highest priority, which makes it possible to adjust resource allocation of the same internal running scenario differently and reduce power consumption of a running process of the target application.

In addition, the operating system can acquire the status information of the game character of the game account owner of the internal running scenario of the target application, based on the status information acquired, it is possible to correspondingly adjust in time the preference usage priorities of the plurality of resource adjustment strategies and conduct preset system resource adjustment with the resource adjustment strategy with the highest priority, so as to avoid high power consumption caused by adjustment operation by continuously using a single resource adjustment strategy of a fixed priority. In this way, intelligence of resource adjustment in a running process of the target application can be improved, power consumption can be reduced, and power-consumption-optimization performance can be improved.

In addition, generally, the application level adjustment strategy tends to focus on performance prioritization.

Figure 5:
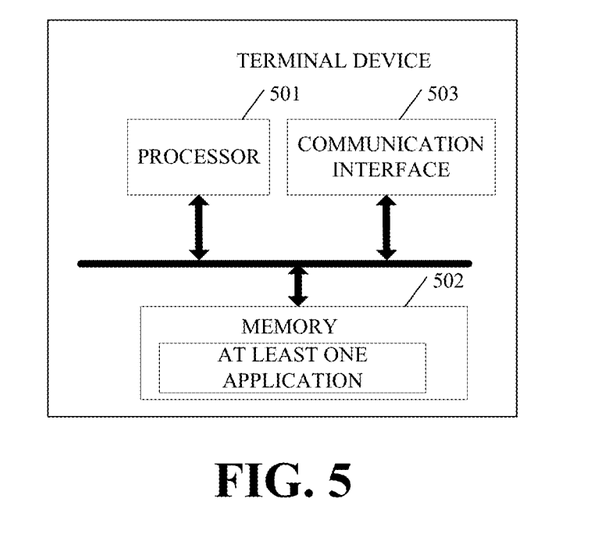
FIG. 5 is a schematic structural diagram illustrating a terminal device according to an implementation of the present disclosure.

Consistent with the implementations illustrated in FIG. 2 to FIG. 4, FIG. 5 is a schematic structural diagram illustrating a terminal device according to an implementation of the present disclosure. At least one application and an operating system run in the terminal device. As illustrated in FIG. 5, the terminal device includes a processor 501, a computer readable storage 502 such as a memory, and a communication interface 503. The memory is configured to store one or more programs which are different from the foregoing at least one applications. The one or more programs are configured to be executed by the processor 501 and include instructions operable to execute the following operations.

An internal running scenario of a target application running in a foreground of the terminal device is identified. A plurality of resource adjustment strategies associated with preset system resources to-be-adjusted in the internal running scenario is acquired. Status information of the internal running scenario is acquired. Usage priorities of the plurality of resource adjustment strategies according to the status information are adjusted. The preset system resources to-be-adjusted is adjusted by selecting a resource adjustment strategy with the highest priority.

According to the implementation of the disclosure, the operating system of the terminal device first identifies the internal running scenario of the target application running in the foreground of the terminal device. The operating system then acquires the plurality of resource adjustment strategies associated with the preset system resources to-be-adjusted in the internal running scenario. The operating system acquires the status information of the internal running scenario. Thereafter, the operating system adjusts the usage priorities of the plurality of resource adjustment strategies according to the status information. At last, the operating system adjusts the preset system resources to-be-adjusted by selecting the resource adjustment strategy with the highest priority. The operating system can adjust dynamically the usage priorities of the plurality of resource adjustment strategies according to the status information of the internal running scenario and adjust the preset system resources by using the resource adjustment strategy with the highest priority, which makes it possible to adjust resource allocation of the same internal running scenario differently and reduce power consumption of a running process of the target application.

As an implementation, the status information includes an operation parameter of an operation interface of the internal running scenario. In terms of adjusting the usage priorities of the plurality of resource adjustment strategies according to the status information, the instructions of the programs are operable to execute the following.

A parameter range to which the operation parameter belongs is determined. Reference usage priorities of the plurality of resource adjustment strategies corresponding to the parameter range are determined, according to a preset correspondence between preset parameter ranges and usage priorities of the plurality of resource adjustment strategies. The usage priorities of the plurality of resource adjustment strategies are adjusted according to the determined reference usage priorities of the plurality of resource adjustment strategies.

As an implementation, the status information is configured to indicate a status of a game character of a game account owner. In terms of adjusting the usage priorities of the plurality of resource adjustment strategies according to the status information, the instructions of the programs are operable to execute the following.

A current status of the game character of the game account owner is determined. Reference usage priorities of the plurality of resource adjustment strategies corresponding to the current status of the game character of the owner game account are determined according to a preset correspondence between statuses of the game character and usage priorities of the plurality of resource adjustment strategies. The usage priorities of the plurality of resource adjustment strategies are adjusted according to the determined reference usage priorities of the plurality of resource adjustment strategies As an implementation, the plurality of resource adjustment strategies associated with the preset system resources to-be-adjusted at least includes an application level adjustment strategy. The application level adjustment strategy includes a strategy for adjusting the preset system resources to-be-adjusted according to application status information of the application and the application status information includes the status information of the internal running scenario.

As an implementation, the preset system resources to-be-adjusted include at least one of: brightness of a display screen, computing resources (computing resources of CPU and GPU), memory resources, and network resources.

The foregoing solution of the implementations of the disclosure is mainly described from the viewpoint of execution process of the method. It can be understood that, in order to implement the above functions, the terminal device includes hardware structures and/or software modules corresponding to the respective functions. Those skilled in the art should readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the terminal device in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

Figure 6:
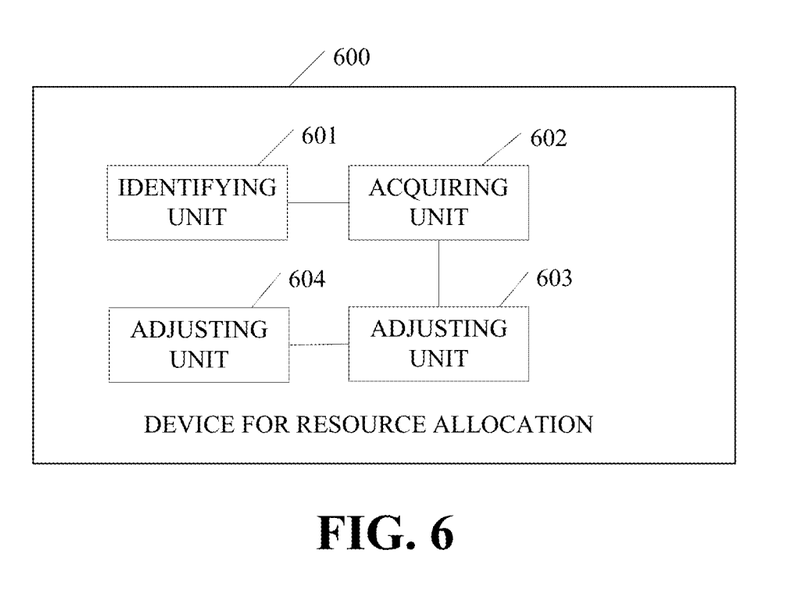
FIG. 6 is a block diagram illustrating functional units of a device for resource allocation according to an implementation of the present disclosure.

FIG. 6 is a block diagram illustrating possible functional units of a device for resource allocation involved in the above implementations. The device 600 includes an identifying unit 601, an acquiring unit 602, an adjusting unit 603, and an adjusting unit 604.

The identifying unit 601 is configured to identify an internal running scenario of a target application running in a foreground of a terminal device.

The acquiring unit 602 is configured to acquire a plurality of resource adjustment strategies associated with preset system resources to-be-adjusted in the internal running scenario.

The acquiring unit 602 is further configured to acquire status information of the internal running scenario.

The adjusting unit 603 is configured to adjust usage priorities of the plurality of resource adjustment strategies according to the status information.

The adjusting unit 604 is configured to adjust the preset system resources to-be-adjusted by selecting a resource adjustment strategy with the highest priority.

According to the implementation of the disclosure, the operating system of the terminal device first identifies the internal running scenario of the target application running in the foreground of the terminal device. The operating system then acquires the plurality of resource adjustment strategies associated with the preset system resources to-be-adjusted in the internal running scenario. The operating system acquires the status information of the internal running scenario. Thereafter, the operating system adjusts the usage priorities of the plurality of resource adjustment strategies according to the status information. At last, the operating system adjusts the preset system resources to-be-adjusted by selecting the resource adjustment strategy with the highest priority. The operating system can adjust dynamically the usage priorities of the plurality of resource adjustment strategies according to the status information of the internal running scenario and adjust the preset system resources by using the resource adjustment strategy with the highest priority, which makes it possible to adjust resource allocation of the same internal running scenario differently and reduce power consumption of a running process of the target application.

As an implementation, the status information includes an operation parameter of the internal running scenario, and the adjusting unit 603 configured to adjust the usage priorities of the plurality of resource adjustment strategies according to the status information is further configured to: determine a parameter range to which the operation parameter belongs; determine reference usage priorities of the plurality of resource adjustment strategies corresponding to the parameter range, according to a preset correspondence between preset parameter ranges and usage priorities of the plurality of resource adjustment strategies; adjust the usage priorities of the plurality of resource adjustment strategies according to the determined reference usage priorities of the plurality of resource adjustment strategies.

As an implementation, the status information is configured to indicate a status of a game character of a game account owner, and the adjusting unit 603 configured to adjust the usage priorities of the plurality of resource adjustment strategies according to the status information is further configured to: determine a current status of the game character of the game account owner; determine reference usage priorities of the plurality of resource adjustment strategies corresponding to the current status of the game character of the owner according to a preset correspondence between statuses of the game character and usage priorities of the plurality of resource adjustment strategies; adjust the usage priorities of the plurality of resource adjustment strategies according to the determined reference usage priorities of the plurality of resource adjustment strategies.

As an implementation, the plurality of resource adjustment strategies associated with the preset system resources to-be-adjusted at least includes an application level adjustment strategy. The application level adjustment strategy includes a strategy for adjusting the preset system resources to-be-adjusted according to application status information of the application and the application status information includes the status information of the internal running scenario.

As an implementation, the preset system resources to-be-adjusted include at least one of: brightness of a display screen, computing resources (computing resources of CPU and GPU), memory resources, and network resources.

In this implementation, the device for resource allocation is presented in the form of units. The "units" herein may refer to an application-specific integrated circuit (ASIC), a processor and a memory that can execute one or more software or firmware programs, an integrated logic circuit, and/or other components that can achieve the above-described functions. In an implementation, the above-identified units are implemented by the processor of the electronic device illustrated in FIG. 5.

Figure 7:
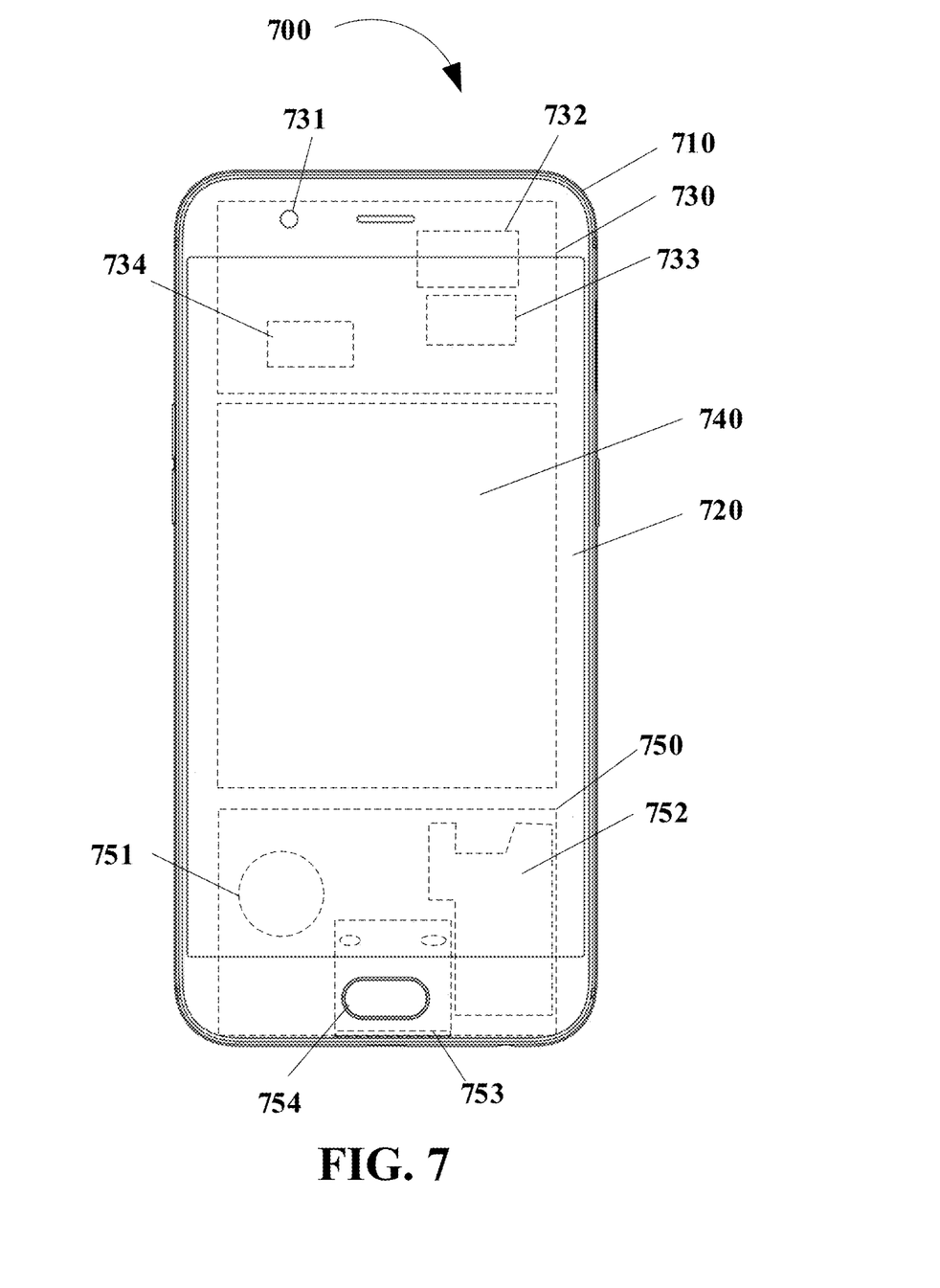
FIG. 7 is a schematic structural diagram illustrating a smart phone according to an implementation of the present disclosure.

FIG. 7 is a schematic structural diagram illustrating a smart phone 700 applicable to the above methods according to an implementation of the present disclosure. The smart phone 700 includes a housing 710, a touch screen 720, a main board 730, a battery 740, and a sub-board 750. The main board 730 is provided with a front camera 731, a processor 732, a memory 733, a power management chip 734, and the like. The sub-board 750 is provided with a vibrator 751, an integrated audio cavity 752, a VOOC flash charging interface 753, and a fingerprint recognition module 754.

The smart phone 700 is configured to identify an internal running scenario of a target application running in a foreground of a terminal device, to acquire a plurality of resource adjustment strategies associated with preset system resources to-be-adjusted in the internal running scenario, to acquire status information of the internal running scenario, to adjust usage priorities of the plurality of resource adjustment strategies according to the status information, and to adjust the preset system resources to-be-adjusted by selecting a resource adjustment strategy with the highest priority.

The processor 732 is the control center of the smart phone and is configured to connect various parts of the whole smart phone through various interfaces and lines, run or execute software programs and/or modules stored in the memory 733, and invoke data stored in the memory 733 to perform various functions of the mobile phone and process data, thereby monitoring the mobile phone as a whole. In at least one implementation, the processor 732 may include one or more processing units. For example, the processor 732 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 732. The processor 732 may be, for example, a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like.

The memory 733 is configured to store software programs and modules, and the processor 732 is configured to execute various function applications and data processing of the mobile phone by running the software programs and the modules stored in the memory 733. The memory 733 mainly includes a program storage area and a data storage area. The program storage area may store an operating system, applications required for at least one function, and so on. The data storage area may store data created according to use of the smart phone, and so on. In addition, the memory 733 may include a high-speed RAM, and may further include a non-transitory memory such as at least one disk storage device, a flash device, or other non-transitory solid storage devices. The memory 733 may be, for example, a random access memory (RAM), a flash memory, a read only memory (ROM), an erasable programmable ROM (EPROM), an electrically EPROM (EEPROM), a register, a hard disk, a mobile hard disk, a compact disc-read only memory (CD-ROM), or any other form of storage medium known in the art.

Implementations of the present disclosure also provide a non-transitory computer storage medium. The non-transitory computer storage medium stores computer programs for electronic data interchange which, when executed, are operable with a computer to execute all or part of the operations of any of the methods described in the above-described method implementations. The computer may include a terminal device.

Implementations of the present disclosure also provide a computer program product. The computer program product includes a non-transitory computer readable storage medium that stores computer programs. The computer programs are operable with a computer to perform all or part of the operations of any of the methods described in the above method implementations. The computer program product may be a software installation package and the computer may include a terminal device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a read-only memory (ROM), a random-access memory (RAM), Disk or compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for resource allocation, applicable to a terminal device with an operating system and at least one application running in the terminal device, the method comprising:
   identifying, by the operating system, a current internal running scenario of a target application running in a foreground of the terminal device;
   acquiring, by the operating system, a plurality of resource adjustment strategies associated with preset system resources to-be-adjusted in the current internal running scenario, wherein the plurality of resource adjustment strategies associated with preset system resources to-be-adjusted in the current internal running scenario are configured to adjust preset system resources to-be-adjusted, the resource adjustment strategies comprise: adjusting according to an application request, adjusting according to user-setting information, adjusting according to the power of the terminal device, adjusting according to the temperature of the terminal device, and adjusting according to ambient light;
   acquiring, by the operating system, status information of the current internal running scenario;
   adjusting, by the operating system, usage priorities of the plurality of resource adjustment strategies according to the status information; and
   adjusting, by the operating system, the preset system resources to-be-adjusted, by selecting a resource adjustment strategy with the highest priority, wherein the preset system resources to-be-adjusted comprise at least one of: brightness of a display screen, computing resources, memory resources, or network resources;
   wherein the status information comprises an operation parameter of an operation interface of the current internal running scenario, the operation parameter of the operation interface of the current internal running scenario comprises at least one of: touch times, touch frequency, or touch duration, and the adjusting, by the operating system, the usage priorities of the plurality of resource adjustment strategies according to the status information comprises:
      determining, by the operating system, a parameter range to which the operation parameter belongs;
      determining, by the operating system, reference usage priorities of the plurality of resource adjustment strategies corresponding to the parameter range, according to a preset correspondence between preset parameter ranges and usage priorities of the plurality of resource adjustment strategies; and
      adjusting, by the operating system, the usage priorities of the plurality of resource adjustment strategies according to the determined reference usage priorities of the plurality of resource adjustment strategies.

2. The method of claim 1, wherein
   the plurality of resource adjustment strategies associated with the preset system resources to-be-adjusted comprises an application level adjustment strategy; and
   the application level adjustment strategy comprises a strategy for adjusting the preset system resources to-be-adjusted according to application status information of the application, and the application status information comprises the status information of the current internal running scenario.

3. The method of claim 1, wherein the target application is a game application, the current internal running scenario comprises a team battle scenario and a mall scenario, the team battle scenario comprises a waiting-for-resurrection sub-scenario, a sub-scenario of a team battle screen waiting to be loaded, and a sub-scenario of waiting to return to a city.

4. A terminal device, comprising:
   a processor; and
   a memory configured to store executable program codes, which, when executed, cause the processor to:
      identify a current internal running scenario of a target application running in a foreground of the terminal device;
      acquire a plurality of resource adjustment strategies associated with preset system resources to-be-adjusted in the current internal running scenario, wherein the plurality of resource adjustment strategies associated with preset system resources to-be-adjusted in the current internal running scenario are configured to adjust preset system resources to-be-adjusted, the resource adjustment strategies comprise: adjusting according to an application request, adjusting according to user-setting information, adjusting according to the power of the terminal device, adjusting according to the temperature of the terminal device, and adjusting according to ambient light;
      acquire status information of the current internal running scenario;
      adjust usage priorities of the plurality of resource adjustment strategies according to the status information; and
      adjust the preset system resources to-be-adjusted, by selecting a resource adjustment strategy with the highest priority, wherein the preset system resources to-be-adjusted comprise at least one of: brightness of a display screen, computing resources, memory resources, or network resources;
      wherein the status information comprises an operation parameter of the current internal running scenario and the executable program codes causing the processor to adjust the usage priorities of the plurality of resource adjustment strategies according to the status information cause the processor to:
         determine a parameter range to which the operation parameter belongs;
         determine reference usage priorities of the plurality of resource adjustment strategies corresponding to the parameter range, according to a preset correspondence between preset parameter ranges and usage priorities of the plurality of resource adjustment strategies; and adjust the usage priorities of the plurality of resource adjustment strategies according to the determined reference usage priorities of the plurality of resource adjustment strategies;

wherein the operation parameter of the current internal running scenario comprises at least one of: touch times, touch frequency, or touch duration.

5. The terminal device of claim 4, wherein the plurality of resource adjustment strategies associated with the preset system resources to-be-adjusted comprises an application level adjustment strategy; and the application level adjustment strategy comprises a strategy for adjusting the preset system resources to-be-adjusted according to application status information of an application and the application status information comprises the status information of the current internal running scenario.

6. The terminal device of claim 4, wherein the target application is a game application, the current internal running scenario comprises a team battle scenario and a mall scenario, the team battle scenario comprises a waiting-for-resurrection sub-scenario, a sub-scenario of a team battle screen waiting to be loaded, and a sub-scenario of waiting to return to a city.

7. A non-transitory computer-readable storage medium storing a computer program which, when executed by a processor, causes the processor to:

identify a current internal running scenario of a target application running in a foreground of a terminal device;

acquire a plurality of resource adjustment strategies associated with preset system resources to-be-adjusted in the current internal running scenario, wherein the plurality of resource adjustment strategies associated with preset system resources to-be-adjusted in the current internal running scenario are configured to adjust preset system resources to-be-adjusted the resource adjustment strategies comprise: adjusting according to an application request, adjusting according to user-setting information, adjusting according to the power of the terminal device, adjusting according to the temperature of the terminal device, and adjusting according to ambient light;

acquire status information of the current internal running scenario;

adjust usage priorities of the plurality of resource adjustment strategies according to the status information; and adjust the preset system resources to-be-adjusted, by selecting a resource adjustment strategy with the highest priority, wherein the preset system resources to-be-adjusted comprise at least one of: brightness of a display screen, computing resources, memory resources, or network resources;

wherein the status information comprises an operation parameter of an operation interface of the current internal running scenario, and the computer program executed by the processor to adjust the usage priorities of the plurality of resource adjustment strategies according to the status information is further executed by the processor to:

determine a parameter range to which the operation parameter belongs;

determine reference usage priorities of the plurality of resource adjustment strategies corresponding to the parameter range, according to a preset correspondence between preset parameter ranges and usage priorities of the plurality of resource adjustment strategies; and adjust the usage priorities of the plurality of resource adjustment strategies according to the determined reference usage priorities of the plurality of resource adjustment strategies;

wherein the operation parameter of the operation interface of the current internal running scenario comprises at least one of: touch times, touch frequency, or touch duration.

8. The non-transitory computer-readable storage medium of claim 7, wherein the target application is a game application, the current internal running scenario comprises a team battle scenario and a mall scenario, the team battle scenario comprises a waiting-for-resurrection sub-scenario, a sub-scenario of a team battle screen waiting to be loaded, and a sub-scenario of waiting to return to a city.

* * * * *